United States Patent [19]

Funatsu

[11] Patent Number: 5,677,789
[45] Date of Patent: Oct. 14, 1997

[54] BINOCULAR

[75] Inventor: Gouji Funatsu, Tokyo, Japan

[73] Assignee: Asahi Kogaku Kogyo Kabushiki Kaisha, Tokyo, Japan

[21] Appl. No.: 356,569

[22] Filed: Dec. 15, 1994

[30] Foreign Application Priority Data

Jan. 12, 1994 [JP] Japan ................ 6-000455
Jan. 12, 1994 [JP] Japan ................ 6-000456
Jan. 12, 1994 [JP] Japan ................ 6-014035

[51] Int. Cl.[6] ................ G02B 23/00; G02B 5/00
[52] U.S. Cl. .............. 359/409; 359/407; 359/418; 359/895
[58] Field of Search ................ 359/399–428, 359/480–482, 894–896; 354/64

[56] References Cited

U.S. PATENT DOCUMENTS

| | | | |
|---|---|---|---|
| 4,205,894 | 6/1980 | Filipovich et al. | 359/400 |
| 4,989,963 | 2/1991 | Farnung et al. | 359/418 |
| 5,062,698 | 11/1991 | Funathu | 359/414 |
| 5,066,965 | 11/1991 | Tanaka et al. | 354/64 |
| 5,191,471 | 3/1993 | Funathu | 359/414 |
| 5,212,591 | 5/1993 | Funathu | 359/524 |
| 5,245,731 | 9/1993 | Funathu | 24/200 |
| 5,267,079 | 11/1993 | Riedl | 359/418 |
| 5,495,364 | 2/1996 | Palmer | 359/409 |

*Primary Examiner*—Thong Nguyen
*Attorney, Agent, or Firm*—Greenblum & Bernstein P.L.C.

[57] ABSTRACT

A binocular incorporates a focusing and diopter correction mechanism having a common shaft, whereby the diopter adjustment is performed by rotation of the shaft and the focusing operation is performed by axial movement of the shaft. The lens-moving portions of the focusing/diopter adjustment mechanism are in a cavity having an access hole, in which the shaft enters the access hole through a water-tight seal to control the lens-moving portions of the adjustment mechanism. The binocular also incorporates a strap attaching mechanism having a spring-loaded clip and groove, wherein a flanged pin provided to a strap end is pushed past the clip into the groove, and the clip returns under the bias of the spring to hold the flanged pin in the groove. Also included is an eyecup adjustment mechanism having two positions defined by click-stops, wherein the eyecups are not rotatable, but are longitudinally slidable relative to corresponding support barrels.

24 Claims, 9 Drawing Sheets

BINOCULAR

BACKGROUND OF THE INVENTION

The present invention relates to binocular optical devices, and more specifically, to a binocular having improved functioning ability in a wet or harsh environment.

A binocular intended for use in a wet or harsh environment, a so-called waterproof binocular, poses special design constraints. For example, the binocular may be designed to have all the functions of a conventional binocular, yet every screw, seal, and interface must be impervious to the penetration of water. Moreover, all the components of a harsh environment binocular must be more rugged in construction than those of a conventional binocular. Balancing the constraints of construction for harsh environments while maintaining facility of use poses a particular problem.

For example, a conventional binocular may have thin rubber eye cups to fit the eye of a user. If the user wears spectacles, the eye cups are conventionally designed to fold back over the eyepieces of the conventional binocular, allowing the lenses of a pair of spectacles to become closer to the eyepieces. In a harsh environment, the thin rubber eye cup is inappropriate as it may be subject to wear, degradation from sunlight, tearing, or other hazards. Furthermore, the use of a thin rubber eye cup may not be practical when the eyepieces themselves are rubberized or armored, therefore having a larger diameter. Yet, the binocular must still allow the user with spectacles to use the binocular without removing his spectacles.

Furthermore, a conventional binocular is also provided with a strap and strap-holding loops provided to the binocular body. The strap is typically loosely strung through the loops. However, the strap-holding loops may be fixed to the binocular with screws or other means which could allow the entry of water or dirt, in a harsh environment. The relative position of the loose strap and the binocular itself easily changes, which can be troublesome. The strap holding loops and loose strap do not provide for the adjustability necessary for a harsh environment tool.

Yet further, any binocular must have adjusting mechanisms both for focusing and for diopter correction. The diopter correction mechanism is used to correct for differences between a user's left and right eyes, and conventionally moves only one of a pair of optical elements that are used by the focusing mechanism. In a pair of harsh environment binoculars, both mechanisms must be waterproof, yet easily accessible to the user. At the same time, the number of waterproof (sealed) interfaces should be minimized.

SUMMARY OF THE INVENTION

It is therefore an object of the present invention to provide an improved binocular having at least eyepiece, strap, and focusing/diopter adjustment mechanisms with an improved resistance to a harsh environment. It is a further object of the present invention to improve the facility of use of such mechanisms.

According to one aspect of the present invention a binocular includes a central body, having an interior portion sealed against the intrusion of water; first and second lens barrels provided to the body, having first and second focusing lens frames provided therein, respectively, and each of the focusing lens frames being movable in the direction of a respective optical axis; a first recess provided in the body; a rotatable focusing member provided in the first recess, and accessible to a user; a hole formed in the body; an adjusting shaft, penetrating the body to the interior portion through the hole and having an axis parallel to the optical axes, the adjusting shaft driven by the focusing member and able to axially drive the lens frames to focus the binocular; and a sealing member, provided between the hole and the shaft, and sealing the hole and the interior portion against the intrusion of water while allowing the adjusting shaft to drive the lens frames.

Preferably, the body further includes a partition between the interior portion of the body and the first recess, and a hole formed in the partition between the interior portion and the first recess. Further preferably, an inner surface of the focusing member is threaded, the inner surface engages a ring piece which is threaded on an outer surface, and the ring piece engages the adjusting shaft, such that when the focusing member is rotated, the engaging inner and outer surface threads drive the ring piece axially, the ring piece driving the adjusting shaft axially in turn, and thereby driving the lens frames to focus the binocular. In this case, the ring piece is provided with guide holes which engage guide members, which are parallel with the adjusting shaft axis. The ring piece is restricted from rotation but allowed to move in a direction of the adjusting shaft axis by the engagement of the guide members and the guide holes.

According to another aspect of the present invention, a binocular includes a central body, having an interior portion sealed against the intrusion of water; first and second lens barrels provided to the body, having first and second focusing lens frames provided therein, respectively, and each of the focusing lens frames being moveable in the direction of a respective optical axis; a first and second recess provided in the body; a rotatable focusing member provided in the first recess, and accessible to a user; a diopter correction knob, provided to the second recess, and accessible to a user; a first hole formed in the body between the interior portion and the first recess; a second hole provided in the body between the first recess and the second recess; a first adjusting shaft, penetrating the body into the interior portion through the first hole and having an axis parallel to the optical axes, the first adjusting shaft being axially driveable by the focusing member and able to axially drive the lens frames to focus the binocular, and the first adjusting shaft being rotatably supported; a second adjusting shaft, passing through the second hole from the second recess into the first recess, engaging the body in a manner to be rotatable but not axially movable, and engaging the first adjusting shaft in a manner such that the first adjusting shaft is rotatively driveable by the second adjusting shaft but axially movable relative to the second adjusting shaft, the second adjusting shaft engaged with the diopter correction knob and drivable by rotation of the diopter correction knob; and a sealing member, provided between the hole and the shaft, and sealing the hole against the intrusion of water while allowing the adjusting shaft to drive the lens frames.

Preferably, the first adjusting shaft is threaded at a distal and proximate to the lens frames, and the threaded end of the first adjusting shaft is associated with the first lens frame, such that when the first adjusting shaft is rotatively driven by the second adjusting shaft, the first lens frame is moved, relative to the second lens frame, in the direction of the optical axis of the first lens frame. Further preferably, the focusing member and ring piece are arranged as described in the preceding aspect of the invention. Still further preferably, the second adjusting shaft is provided with guide members on an exterior surface, and the diopter correction knob is provided with axial guide grooves on an interior surface, engaging the guide members, such that the diopter correction knob is axially movable relative to the second adjusting shaft but able to rotatively drive the second adjusting shaft, and the diopter correction knob is retractable into the second recess. In this case, a spring-loaded retraction mechanism is provided between the diopter correction knob and the second adjusting shaft, such that the retraction mechanism is able to hold the diopter correction knob in a retracted position in the second recess when the diopter correction knob is pushed towards the body and subsequently released. The retraction mechanism is able to return the diopter correction knob to an extracted position protruding from the second recess when the diopter correction knob is again pressed towards the body and subsequently released. The retraction means has a cyclic operation between the holding and the returning.

According to still another aspect of the present invention, a waterproof binocular includes a watertight portion having a hole formed in a wall of the watertight portion; a first shaft, penetrating the wall via a hole in the watertight portion, the first shaft supported to be both axially movable and rotatable; a second shaft able to rotatively drive the first shaft, and supported to be rotatable but not movable in an axial direction of the second shaft; a first control member, provided to the first shaft, for moving the first shaft axially; a second control member, provided to the second shaft, for rotating the second shaft and thereby the first shaft, a sealing member, provided between the first shaft and the wall, for sealing the hole against the intrusion of water, the sealing member allowing the rotational and axial movement of the first shaft. In this case, the first shaft controls a first mechanism in the watertight portion of the binocular when axially moved, and controls a second mechanism in the watertight portion of the binocular when rotatively moved.

According to yet another aspect of the present invention, a binocular includes a body; a pair of lens barrels provided to the binocular body, and each lens barrel housing an objective lens; a holding mechanism provided to each of the lens barrels on an outer surface; a locking mechanism provided to each holding mechanism, and a strap, in which one end is held by each holding mechanism and locked in the holding mechanism by the locking mechanism. Preferably, the strap is provided at each end with a pin to engage the holding mechanism and the locking mechanism, and the pin is formed with a flanged end. Further preferably, the holding mechanism includes a groove in the lens barrel and open at the surface of the lens barrel and at one end of the groove, the groove having an inverted-T cross section to engage the pin.

According to yet still another aspect of the present invention, a binocular includes a body; a pair of lens barrels provided to the body, each of the lens barrels housing an objective lens; a groove formed in an outside surface of each of the lens barrels, the grooves being open at the surface of the lens barrel and open at an end of the grooves; a recess formed in each of the lens barrels at the open end of the grooves; a locking member provided in each of the recesses, which is retained in the recess by a shoulder formed in the lens barrel and movable down into the recess and up to the shoulder, the locking member biased by a spring away from the recess, and the locking member blocking the open end of the groove in an up position and exposing the open end of the groove when depressed down; a strap; and a pin provided at each end of the strap. Preferably, the strap is fixed to the binocular by pressing the lock member into the recess to expose the open end of the groove, sliding the pin into the exposed groove, and releasing the lock member to block the open end of the groove, and the strap is removed from the binocular by pressing the lock member into the recess to expose the open end of the groove, sliding the pin from the exposed groove, and releasing the lock member to block the open end of the groove. Further preferably, the pin is formed with a flanged end, and the groove has an inverted-T cross section to engage the pin.

According to a further aspect of the present invention, an eyepiece mechanism for a binocular includes an eyecup ring support barrel, fixed to the binocular; an eyecup ring, axially slidable relative to the support barrel; a flexible eyecup fixed to the eyecup ring; and a clicking mechanism for clicking the axially movable eye ring into at least two axial positions along the support barrel. Preferably, the clicking mechanism includes at least one clicking protrusion formed on an outer surface of the eyecup ring support barrel; and at least one clicking hole, formed on an inner surface of the eyecup ring and engageable to the clicking protrusions, and the clicking protrusion and the clicking hole generate a clicking noise and a resistance to relative movement between the eyecup ring and the eyecup ring support barrel when the clicking protrusion and the clicking hole engage or disengage. Further preferably, the clicking protrusions and clicking holes are provided as diametrically opposite pairs of clicking protrusions and clicking holes, with reference to diameters of the eyecup ring support barrel and the eyecup ring, respectively. Still further preferably, the mechanism further includes at least one guide groove provided to the eyecup ring support barrel; and at least one guide follower provided to the eyecup ring and the eyecup ring is linearly slidable relative to the eyecup ring support barrel, and restricted from rotating relative to the eyepiece, by an engagement of the guide follower and the guide groove.

DESCRIPTION OF THE ACCOMPANYING DRAWINGS

DESCRIPTION OF THE EMBODIMENTS

With reference to the drawings, the embodiments of the present invention are described. Throughout the following description, duplicate elements on left and right sides of the binocular 10 will be described with "L" and "R" suffixes, respectively, and where duplicate elements exist, only the right side ("R" suffix) is described.

Figure 1:
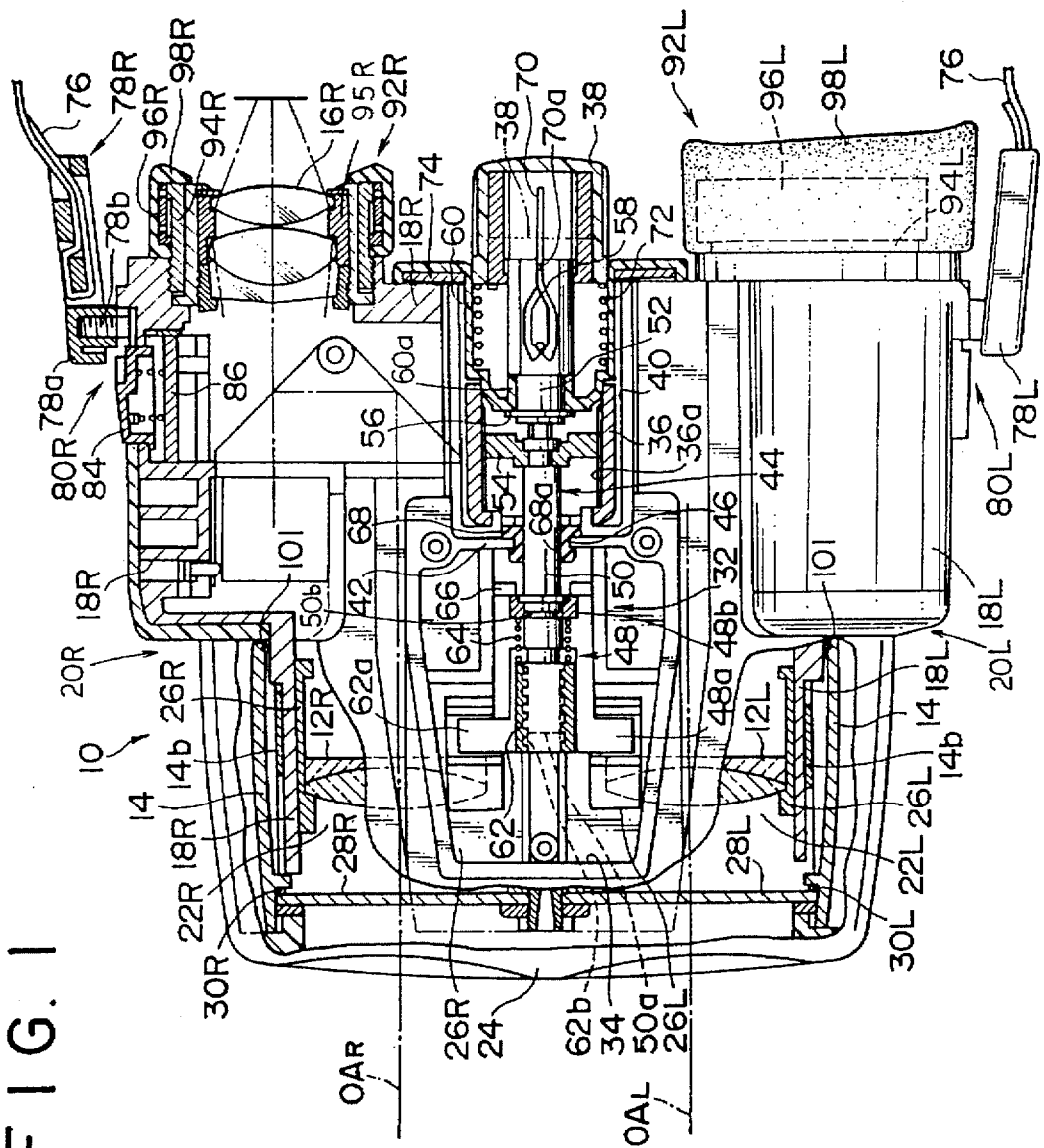
FIG. 1 is a partially sectioned plan view of a binocular to which the present invention is applied.

As shown in FIG. 1, a binocular 10 embodying the invention includes parallel left and right telescope systems 20L and 20R connected to each other by a main body 14. A rubber, or other elastomer material, cover 24 is provided to the main body 14. The telescope systems 20L and 20R include lens barrel 18L and 18R, respectively.

The left and right lens barrels 18L and 18R fit into left and right bores 22L and 22R, respectively, formed in the main body 14. The lens barrels 18L and 18R are provided with lens frames 26L and 26R, which house objective lens groups 12L and 12R respectively. The lens frames 26L and 26R are rotatable about optical axes $OA_L$ and $OA_R$ respectively, and slidable in the direction of the optical axes. The lens barrels 18L and 18R are further provided with respective eyepiece units 92L and 92R, which house eyepiece lens groups 16L (not shown) and 16R. The eyepiece lens groups 16L (not shown) and 16R are housed in eyepiece lens frames 95L (not shown) and 95R, which are retained by eyecup support barrels 94L (not shown) and 94R respectively (described later).

The bores 22L and 22R in the main body are provided with protective windows 28L and 28R, respectively. The lens frames 26L and 26R are constrained to move in a range behind the windows 28L and 28R. The protective windows 28L and 28R are provided with water-resistant seals 30L and 30R, respectively, where the windows 28L, 28R join the main body 14. O-ring seals 101 are provided between the main body 14 and each of the lines barrels 18L and 18R. Diametrical shoulders on each of the lens barrels 18L and 18R abut inner shoulders 14b, 14b provided in each bore 22L and 22R.

An adjusting mechanism 32, for controlling the diopter correction and focusing operation, is accessible at the top of the binocular body 14. A cavity 34 (interior cavity) and a cover recess 40 are provided in the main body, for housing the adjustment mechanism 32 and focusing and for housing diopter correction control knobs 36 and 38, respectively. The cavity 34 is sealed with a top cover (not shown), to prevent the intrusion of water and the top cover is provided with watertight seals (not shown). A partition plate 42 is provided between the cavity 34 and the cover recess 40.

The adjusting mechanism 32 includes a left drive member 48 having an arm 48a and an engaging recess 48b. The left drive member 48 is supported by a front shaft section 50 of an adjusting shaft assembly 44, such that the adjusting shaft assembly 44 is rotatable within the left drive member 48. The left drive member 48 is slidable within the cavity 34 but restricted from rotating by the walls of the cavity 34 and by a guide groove (not shown) that mates with the bottom of the left drive member 48. This arrangement is generally shown, for example, in U.S. Pat. No. 5,191,471, the disclosure of which is herein incorporated by reference in its entirety. The arm 48a of the left drive member 48 engages the left lens frame 26L, and the left lens frame 26L moves axially together with the left drive member 48.

A right drive member 62 is provided in front of the left drive member 48. A spring 64 is provided between the engaging recess 48b of the left drive member 48 and the right drive member 62 to bias the left drive member 48 away from the right drive member 62. The left drive member 48 always abuts a stopper 66 provided on the main body 14. The right drive member 62 includes an arm 62a and internal threads 62b. The arm 62a of the right drive member 62 engages the right lens frame 26R, and the right lens frame 26R moves axially together with the right drive member 62. The internal threads 62b of the right drive member 62 mate with external threads 50a of the front shaft portion 50 of the adjusting shaft assembly 44. The spring 64 further removes backlash between the mating threads 50a and 62a.

Figure 2:
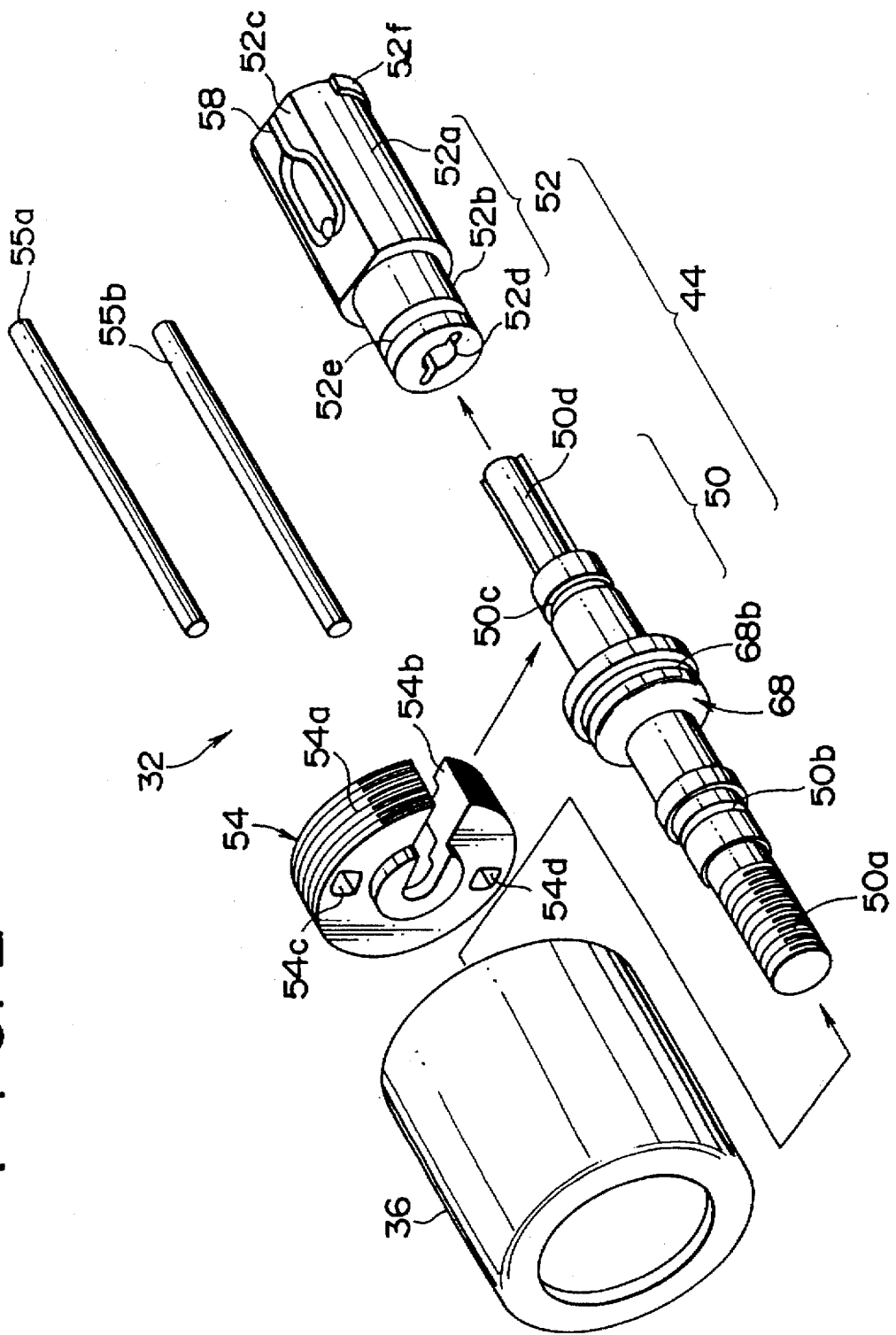
FIG. 2 is an exploded view of an embodiment of a focusing/diopter correction mechanism.

As shown in FIG. 2, the adjusting shaft assembly 44 includes the front and rear shaft sections 50 and 52, respectively. The front shaft section 50 (i.e., focus adjusting shaft) passes through the partition 42, via a shaft hole 46 and the partition is sealed (at the shaft hole 46) with a watertight rubber (or other elastomer material) grommet 68 having a groove 68b in its outer diameter (see FIG. 2), which maintains the integrity of the cavity 34 against the penetration of water when the front shaft section 52 is rotated or axially moved. The outer circumference of the front shaft section 50 is smoothly formed over its range of travel through the shaft hole 46 and grommet 68, while the inner circumference of the shaft hole 46 is smoothly formed at its contact to the groove 68b in the grommet 68. The front and rear shaft sections 50 and 52 engage each other by means of an external spline 50d and an internal spline 52d, such that the shaft sections 50 and 52 are slidable with respect to each other, but not rotatable with respect to each other (i.e., shaft sections 50 and 52 rotate together).

The rear shaft section 52 (i.e., diopter adjusting shaft which is a portion of the diopter adjusting assembly) includes a large diameter portion 52a, a small diameter portion 52b, a flat portion 52c, the internal spline 52d, and a snap ring groove 52e. The flat portion 52c has a cam groove 58 formed therein. The small diameter portion 52b of the rear shaft section 52 is fit into a seal cover bore 60a formed in a seal cover 60, within the cover recess 40 in the main body 14. The seal cover 60 is securely attached to the main body 14, and covers a plate spring 74, also securely attached to the main body 14, which presses on points at the rear surfaces of both lens barrels 18L and 18R. The plate spring 74 forces the diametrical shoulders of the lens barrels 18L and 18R to abut the inner shoulders of the bores 22L and 22R, respectively. The rear shaft section 52 is secured in the seal cover 60 by means of a snap ring 56 fit into the snap ring groove 52e, and is thereby fixed in the axial direction, but freely rotatable. A seal cover recess is formed by the portion of the seal cover 60 intruding into the body recess 40 (i.e., the portion of the seal cover 60 between the plate spring 74 and the snap ring 56), as shown in FIG. 3.

Figure 3:
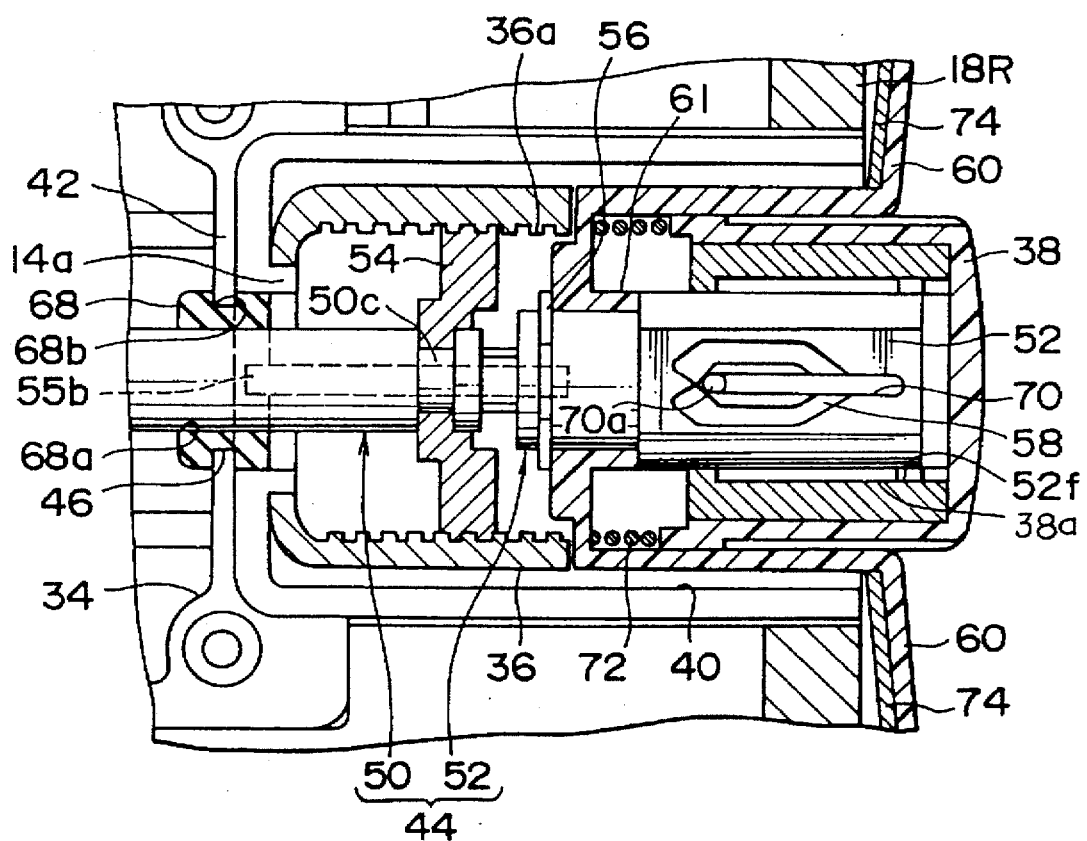
FIG. 3 is a detailed view of the embodiment of a focusing/diopter correction mechanism.

As shown in FIG. 3, a pair of diametrically opposite guide projections 52f (shown in FIG. 2) on the rear portion of the rear shaft 52 engage corresponding guide grooves 38a, 38a formed in the diopter correction control knob 38. The guide grooves 38a, 38a extend axially along the inner surface of the diopter correction control knob 38. Thus, when the diopter correction control knob is turned, the entire shaft assembly 44 is turned with it. The diopter correction control knob 38 can be moved axially relative to the rear shaft 52 and can turn the shaft assembly 44 in any axial position. A return spring 72 is provided between the diopter correction control knob 38 and the inner surface of the seal cover 60.

The front shaft section 50 includes external threads 50a, a first engagement groove 50b, a second engaging groove 50c, and the previously described external spline 50d. When assembled in the main body 14, the first engagement groove 50b engages the engaging recess 48b of the left drive member 48. The second engaging groove 50c is engaged to a ring piece 54 such that it is rotatable relative to the ring piece 54 but moves axially together with the ring piece 54.

The ring piece 54 includes external threads 54a; a mounting slot 54b for assembly purposes and for engaging the groove 50c of the front shaft section 50; and top and bottom axial guide holes 54c and 54d, which restrict the ring member from rotating when mated to corresponding top and bottom axial guide dowels 55a, 55b (i.e., guide members) provided to the recess 40. The front and rear distal ends of the each of the axial guide dowels, 55a, 55b are firmly inserted into depressions formed in the rear wall of the main body 14 and the front wall of the seal cover 60, respectively.

The external threads 54a of the ring piece 54 mate with internal threads 36a of the focusing control knob 36. The focusing control knob is rotatable but fixed in the axial direction in the recess 40 (in front of the seal cover 60), and is supported by a circular support ridge 14a formed on the main body 14.

During a focusing operation, the focusing control knob 36 is turned in either a clockwise or counterclockwise direction. Since the ring piece is constrained by the guide dowels 55a and 55b and guide holes 54c and 54d to move only axially (without rotation), the internal threads 36a of the focusing control knob 36 move the ring piece 54 forward or backward, depending on the direction of rotation of the focusing control knob 36. The engagement of the ring piece 54 with the second engaging groove 50c of the front shaft section 50 moves the front shaft section 50 (without rotation) with the ring piece 54. As shown in FIG. 1, since (a) the first engaging groove 50b of the front shaft section 50 engages the left drive member 48 at the engaging recess 48b, and (b) the external threads 50a of the front shaft portion 50 engage the internal threads 62b of the right drive member 62, both drive member 48 and 62 are moved together axially. The arm 48a of the left drive member 48 engages the left lens frame 26L, and the arm 62a of the right drive member 62 engages the right lens frame 26R, so both the left and right lens frames 26L and 26R are moved together in the direction of the optical axes $OA_L$ and $OA_R$, and the focusing operation is achieved. The external spline 50d of the front shaft section 50 moves relative to the internal spline 52d of the rear shaft section 52, and the diopter correction control knob 38 is unaffected by the focusing operation.

During a diopter correction operation, the diopter correction control knob 38 is turned in either a clockwise or counterclockwise direction. The entire adjusting shaft assembly 44 is turned with the diopter correction control knob 38 (FIG. 3) by means of the guide grooves 38a, 38a, guide projections 52f, 52f, internal spline 52d, and external spline 50d, in a direction of rotation corresponding to that of the diopter correction control knob 38. The mating of the external threads 50a of the front shaft section 50 and the internal threads 62b of the right drive member 62 moves the right drive member 62 axially. The arm 62a of the right drive member 62 engages the right lens frames 26R, so the right lens frame 26R is moved in the direction of the optical axis $OA_R$, and the diopter correction operation is achieved. The front shaft section 50 rotates freely within the ring piece 54 and the engaging portion 48b of the left drive member 48, so neither the focusing knob 36 nor the left lens frame 26L are affected by the diopter correction operation.

The diopter correction knob 38 is structured to be retractable into a seal cover recess formed in the seal cover 60 (within the cover recess 40) by means of the cam groove 58 formed on the flat portion of the rear shaft portion 52. As shown in FIG. 3, a spring member 70 is attached to the inner surface of the diopter correction control knob 38. The spring member 70 is formed from a resilient rod bent down at the tip 70a, which engages the cam groove 58. This arrangement is generally shown, for example, in U.S. Pat. No. 5,191,471, the disclosure of which is herein incorporated by reference in its entirety. As previously described, a return spring 72 is provided between the diopter correction control knob 38 and the seal cover 60 to bias the diopter correction control knob 38 away from the seal cover 60 (rearward).

Figure 4:
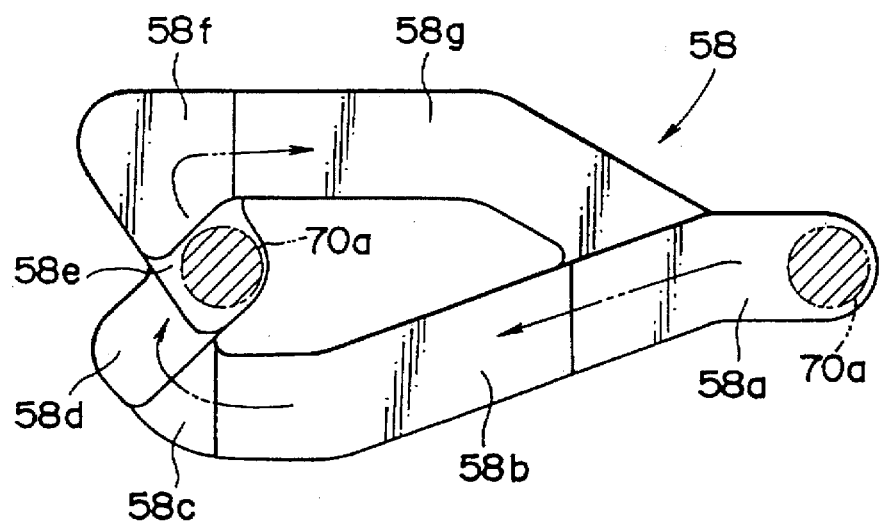
FIG. 4 is a plan view of a cam groove structure of the embodiment of a focusing/diopter correction mechanism.
Figure 5:
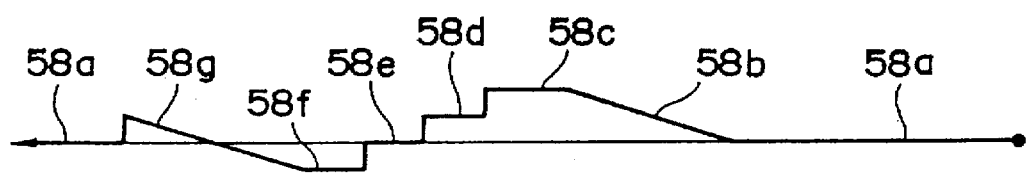
FIG. 5 is a profile view of the cam groove structure of FIG. 4.

FIG. 4 shows a plan view of the cam groove 58 structure. The cam groove portions have a depth and profile as shown in FIG. 5. The cam groove 58 is wide enough to accommodate and guide the tip 70a of the spring member 70. The cam groove is shaped as a path, proceeding from up a holding portion 58a through a forward path 58b, down a click ledge between portions 58c and 58d, and reversing down over another click ledge between portion 58d and holding recess 58e, to the holding recess 58e. A return path proceeds forward from the holding recess 58e, down over a click ledge between the holding recess 58e and reversing portion 58f, then reverses up along return path 58g, up over another click ledge between return path 58g and holding portion 58a, to holding portion 58a. Up and down in the context of the preceding description refers to the profile depth of the cam groove 58 as shown in FIG. 5.

Starting from an extended position, when the diopter correction control knob 38 is pressed in against the bias of the return spring 72, the tip 70a of the spring member 70 follows the cam groove 58, and clicks twice over the described click ledges along the path, before settling in the holding recess 58e as the knob 38 is released. The knob 38 is then stably held in a retracted position in the seal cover recess by the engagement of the tip 70a and the cam groove 58 at the holding recess 58e. During this retraction process (or an extraction process), the axial guide grooves 38a on the inside of the diopter correction control knob 38 are moved along the guide protrusions 52f of the rear shaft section 52.

To extend the knob 38, when the diopter correction control knob 38 is pressed in again against the bias of the return spring 72, the tip 70a of the spring member 70 follows the cam groove 58, and clicks twice over the described click ledges along the return path, before settling in the holding portion 58a as the knob 38 is released. The knob 38 is then stably held in an extended position protruding from the seal cover recess by the engagement of the tip 70a and the cam groove 58 at the holding portion 58a.

As described, the diopter correction control knob 38 and the focus control knob are independently operable and do not affect one another, and the diopter correction control knob 38 may be easily retracted to an inaccessible position within the seal cover recess after adjustment, and re-extracted easily when an adjustment is to be made.

A strap attachment structure allows easy connection and disconnection of a strap 76 to the binocular 10, enhances the water resistance of the binocular 10, and provides for the adjustability necessary for a harsh environment tool.

As shown in FIG. 1 and in detail in FIGS. 6 through 10, the strap 76 has connection portions 78L and 78R at left and right ends, respectively. The connection portions 78L and 78R fit into corresponding spring-loaded clips 80L and 80R provided to the left and right side lens barrels 18L and 18R, respectively. Since each of the connection portions 78L and 78E are identical in construction, as are the clips 80L and 80R, only the right side connection portion 78R and right side clip 80R are described herein.

The connection portion 78R includes a body 78a and a pin 78b, which has a flanged head 78c. The strap 76 is tightly looped through a labyrinth portion of the body 78a as shown in FIG. 1. The pin 78b is fixed in the body 78a, with the flanged head 78c displaced from the body 78a.

Figure 6:
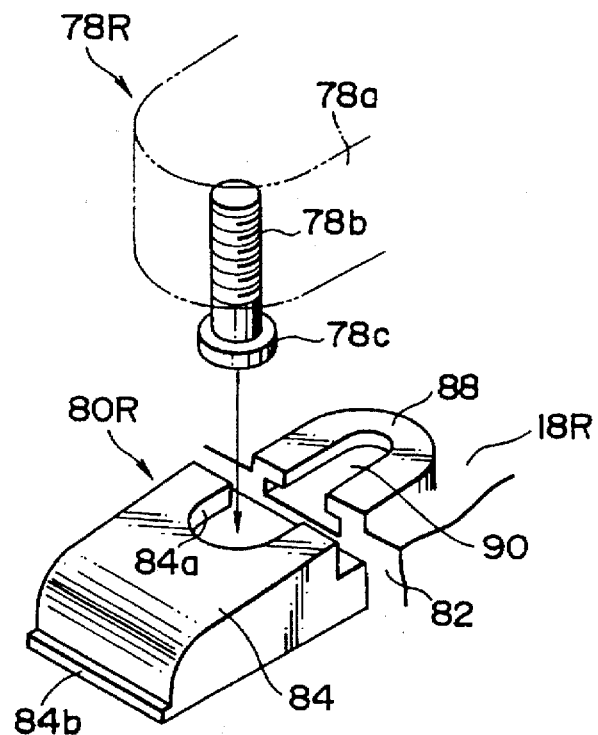
FIG. 6 is a perspective view of an embodiment of a strap attachment mechanism.
Figure 7:
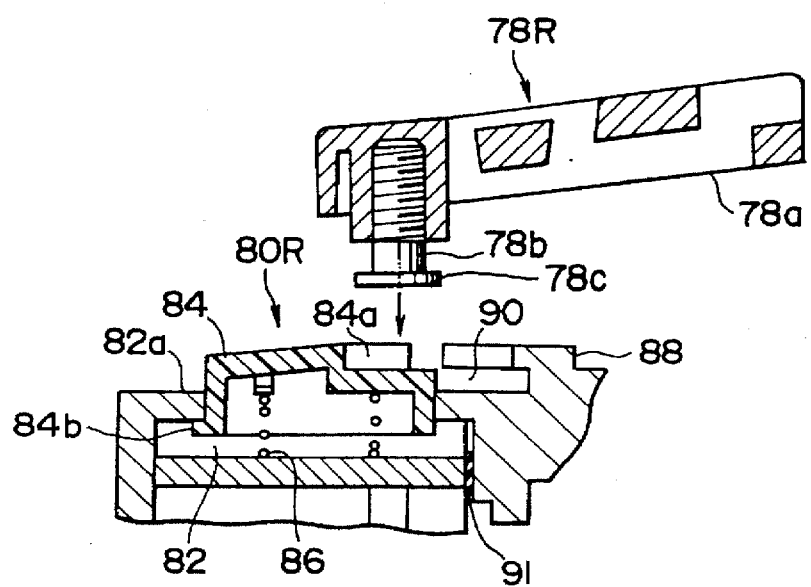
FIG. 7 is a sectional view of the embodiment of a strap attachment mechanism of FIG. 6, showing a first state prior to insertion of a connection portion into a clip.
Figure 8:
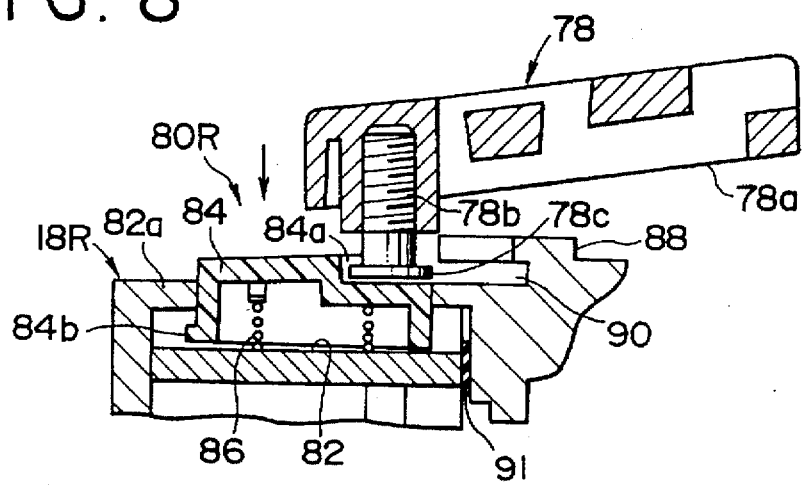
FIG. 8 is a sectional view of the embodiment of a strap attachment mechanism of FIG. 6, showing a second state as the connection portion is inserted.
Figure 9:
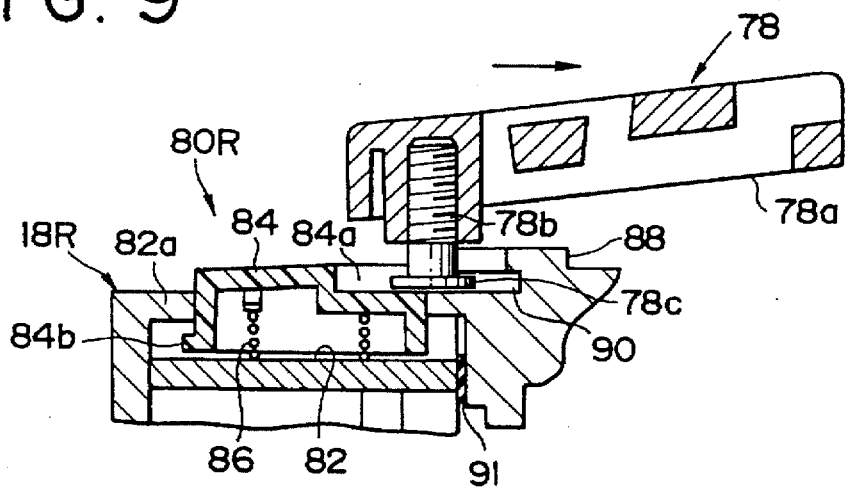
FIG. 9 is a sectional view of the embodiment of a strap attachment mechanism of FIG. 6, showing a third state as the connection portion is slid into a matching slide groove.
Figure 10:
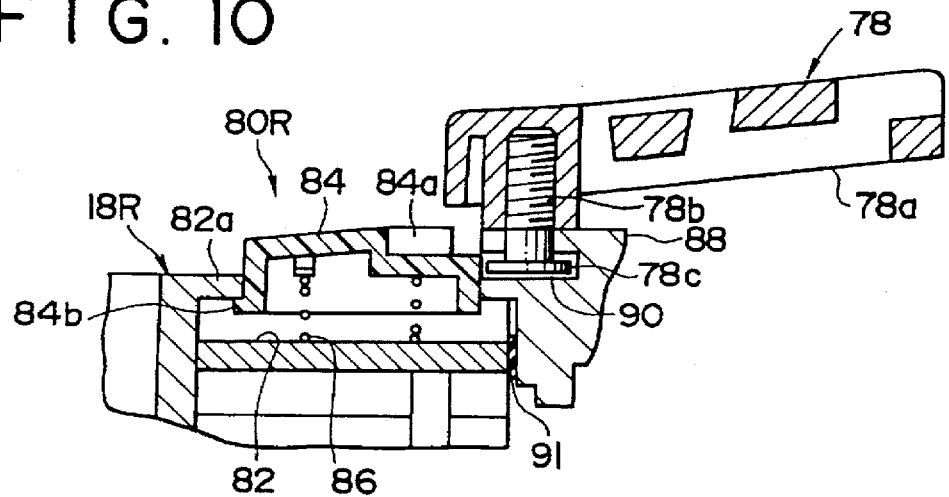
FIG. 10 is a sectional view of the embodiment of a strap attachment mechanism of FIG. 6, showing a fourth state as a lock member locks the connection portion in place.

As shown in FIGS. 6 and 7, the clip 80R includes a recess 82 formed in the right lens barrel 18R, a floating lock member 84 provided in the recess 82, a spring member 86 for biasing the lock member away from the right lens barrel 18R, and an elevated slide groove protrusion 88 for holding the flange 78c of the connection member 78R.

The recess 82 is formed to be deep enough such that the lock member may move vertically in the recess, and has a shoulder 82a to retain the lock member 84 in place. The lock member includes a top recess 84a for accepting the flange 78c of the connection member, and an edge flange 84b for engaging the shoulder 82a of the recess 84a. The top recess is open on the side facing the slide groove protrusion 88 such that the flange 78c of the pin 78b may slide out from the top recess 84a towards the slide groove protrusion 88. The edge flange 84b engages the shoulder 82a of the recess 82, as the lock member 84 is pushed upwards by the spring member 86, retaining the lock member 84 in the recess 82. The lock member 84 is assembled into the recess 82 by attaching a portion of the lens barrel 14 bearing the protrusion 88 to a portion of the lens barrel 14 bearing the lock member 84, and the recess 82 is sealed by a gasket 91.

The slide groove protrusion 88 has an inverted-T shaped groove 90 formed therein, for accepting the flange 78c and shaft of the pin 78b. The inverted-T groove is open on the side facing the lock member 84, such that when the lock member 84 is depressed into the recess 82, the flange 78c of the pin 78b may slide directly from the top recess 84a of the lock member 84 into the inverted-T groove 90. The inverted-T shape the groove 90 is approximately of the same size as the pin 78b, with the top of the T shape slightly wider than the diameter of the flange 78c.

The attaching operation of the connection portion 78R to the clip 80R is shown in FIGS. 7 through 10. The flange 78c is fit into the top recess 84a of the lock member 84 (FIG. 7); the lock member 84 is depressed into the recess 82 by the user pushing on the connection portion 78 (FIG. 8), and the top recess 84a and the slide groove protrusion 88 are thus aligned. The flange 78c of the pin 78b is slid across from the top recess 84a into the inverted-T shaped groove 90 of the slide groove protrusion 88 (FIG. 9); and the lock member 84, biased by the spring 86, returns to a position in the recess 82 remote from the lens barrel 18R, holding the flange 78b in the slide groove protrusion 88 by the edge of the lock member 84.

The connection portion 78 can be easily detached by depressing the lock member 84 with a finger and sliding the flange 78c out of the inverted-T groove 90.

The inverted-T groove 90 is alternatively formed directly in the lens barrel 18R and not in a protrusion from the lens barrel 18R. In such a case, the travel of the lock member 84, in order to insert the flanged portion 78c of the pin 78b, is deeper, but the operation otherwise remains substantially the same.

Thus, the combination of connection portion 78 and clip 80 enables a swift, reliable connection and disconnection of the strap 76 to the binocular 10, and improves the harsh environment resistance and adjustability of the binocular 10.

As shown in FIG. 1, eyecup mechanism 92L and 92R are provided to the left and right lens barrels 18L and 18R, respectively. Since each of the eyecup mechanisms 92L and 92R are identical in construction, only the right side eyepiece mechanism 92R is described herein. Eyepiece mechanism 92R is shown in detail in FIGS. 11 through 13.

Figure 11:
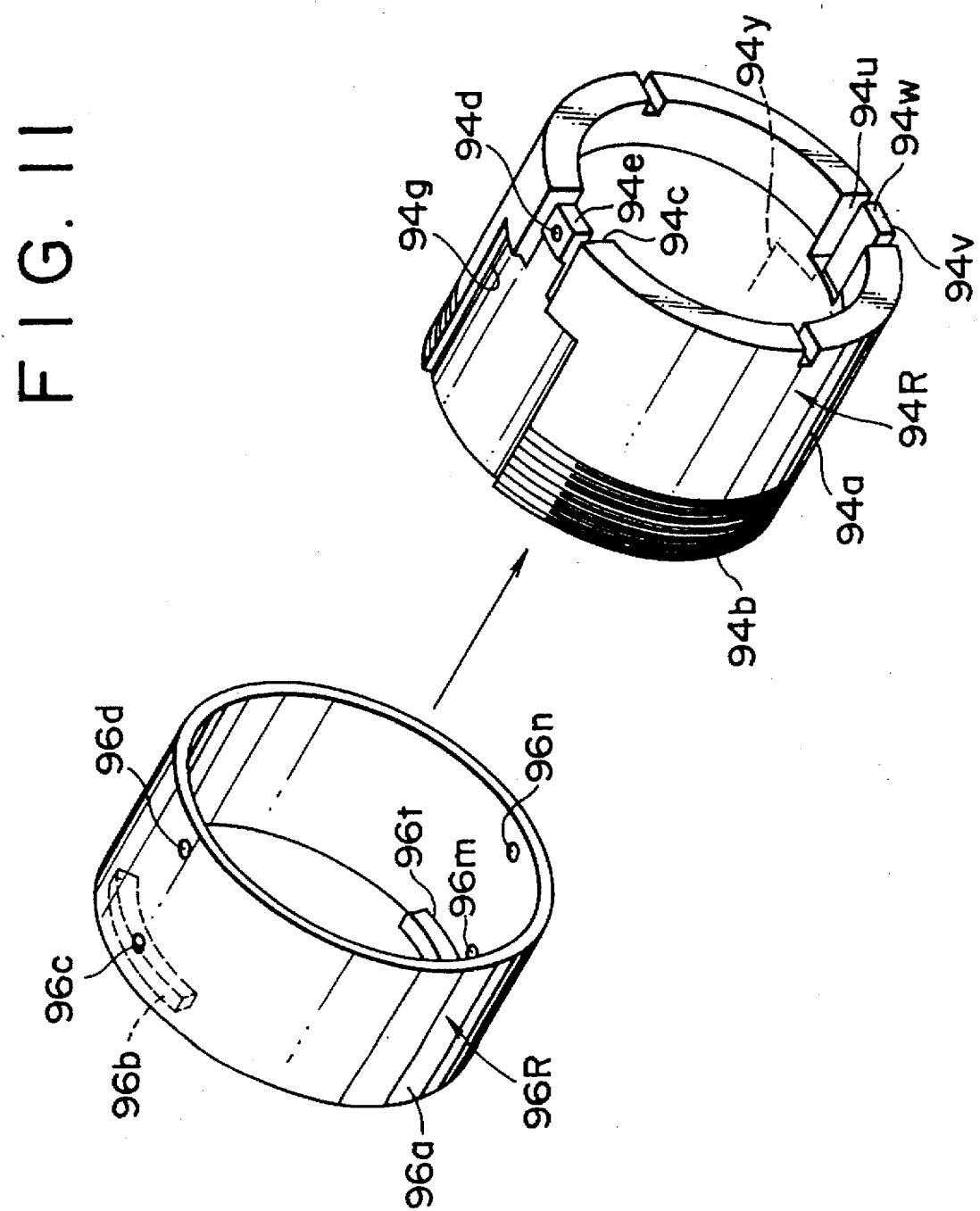
FIG. 11 is an exploded view of an embodiment of an eyepiece structure.
Figure 12:
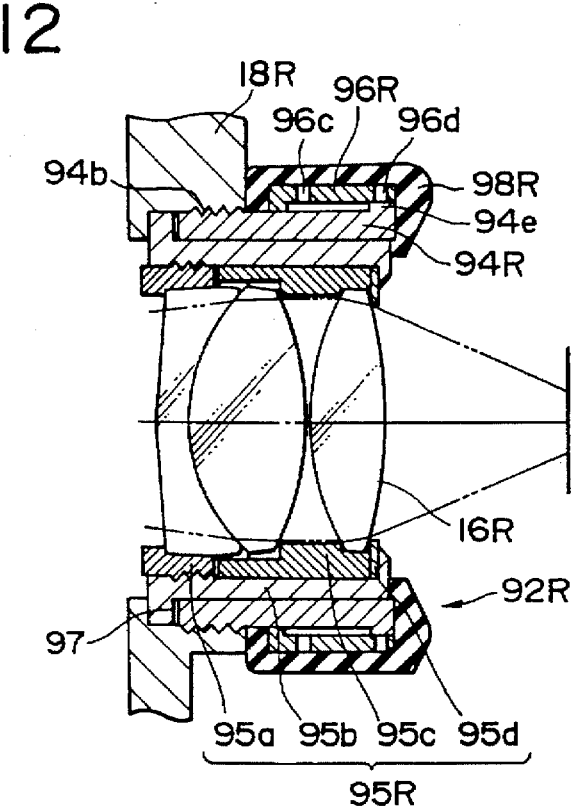
FIG. 12 is a sectional view of the embodiment of an eyepiece structure, showing a first state.
Figure 13:
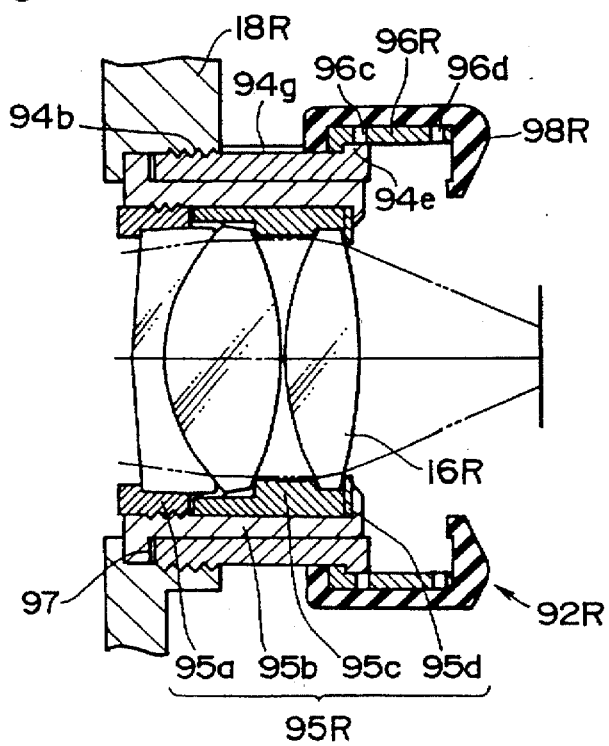
FIG. 13 is a sectional view of the embodiment of an eyepiece structure, showing a second state.

As shown in FIGS. 11, 12, and 13, the eyepiece mechanism 92R includes a tubular threaded eyecup barrel support 94R having external threads 94b and an eyecup barrel 96R. The eyepiece lens frame 95R, which includes eyepiece lens group 16R, concentric portions 95a, 95b, 95c, and gasket 95d, is watertight at gasket 95d. The eyepiece lens frame 95R is held against the lens barrel 18R by the external threads 94b at the front of the eyecup support barrel 94R (mated to internal threads formed in the lens barrel 18R). A gasket 97 is provided between the eyepiece lens frame 95R and eyecup support barrel 94R, making the eyepiece region wholly watertight.

The eyecup support barrel 94R is formed at the rear end with top and bottom recesses 94c and 94u, respectively, in which respective resilient cantilever portions 94e and 94w are formed. The cantilever portions 94e and 94w are resilient by virtue of a relatively thin cross-section in comparison to the eyecup support barrel 94R. The distal ends of the cantilever portions 94e and 94w protrude to match the inner diameter of the eyecup barrel 96R when it is assembled to the support barrel 94R, and have outwardly projecting click protrusions 94d and 94v formed on their respective outer sides. The click protrusions 94d and 94v are formed to project slightly beyond the inner diameter of the eyecup barrel 96R. Further, top and bottom slide grooves 94g and 94y are longitudinally formed on the outer diameter of the eyecup support barrel 94g, aligned with the cantilever portions 94e and 94w and protrusions 94d and 94v.

The top and bottom slide grooves 94g and 94y engage slide ridges 96b and 96t, respectively, formed on the inner circumference of the tubular eyecup barrel 96R. The eyecup barrel 96R therefore moves longitudinally without rotating with reference to the eyecup support barrel 94R. Top and bottom front click-stop holes 96c and 96m, and top and bottom rear click-stop holes 96d and 96n, are formed in the inner circumference of the eyecup barrel 96R. The click stop holes are aligned along the center of the slide grooves 94g, 94y with the click protrusions 94d, 94v. The eyecup barrel 96R may be slid along the eyecup barrel support 94R. The click protrusions 94d and 96v engage the respective click-stop holes 96d and 96n when the eyecup barrel 96R is pushed forwards (eyecups collapsed), and engage the respective click-stop holes 96c and 96m when the eyecup barrel 96R is pulled rearwards (eyecups extended).

As shown in FIGS. 12 and 13, the eyecup mechanism 92R is completed with a rubber eyecup 98R surrounding the eyecup barrel 96R. When a user wearing spectacles uses the binocular, the eyecup mechanism 92R is clicked (collapsed) into the position shown in FIG. 12, where the click protrusions 94d and 94 v engage the respective click-stop holes 96d and 96n. In normal use, the eyecup mechanism 92R is clicked (extended) into the position shown in FIG. 13, where the click protrusions 94d and 94v engage the respective click-stop holes 96c and 96m.

Figure 14:
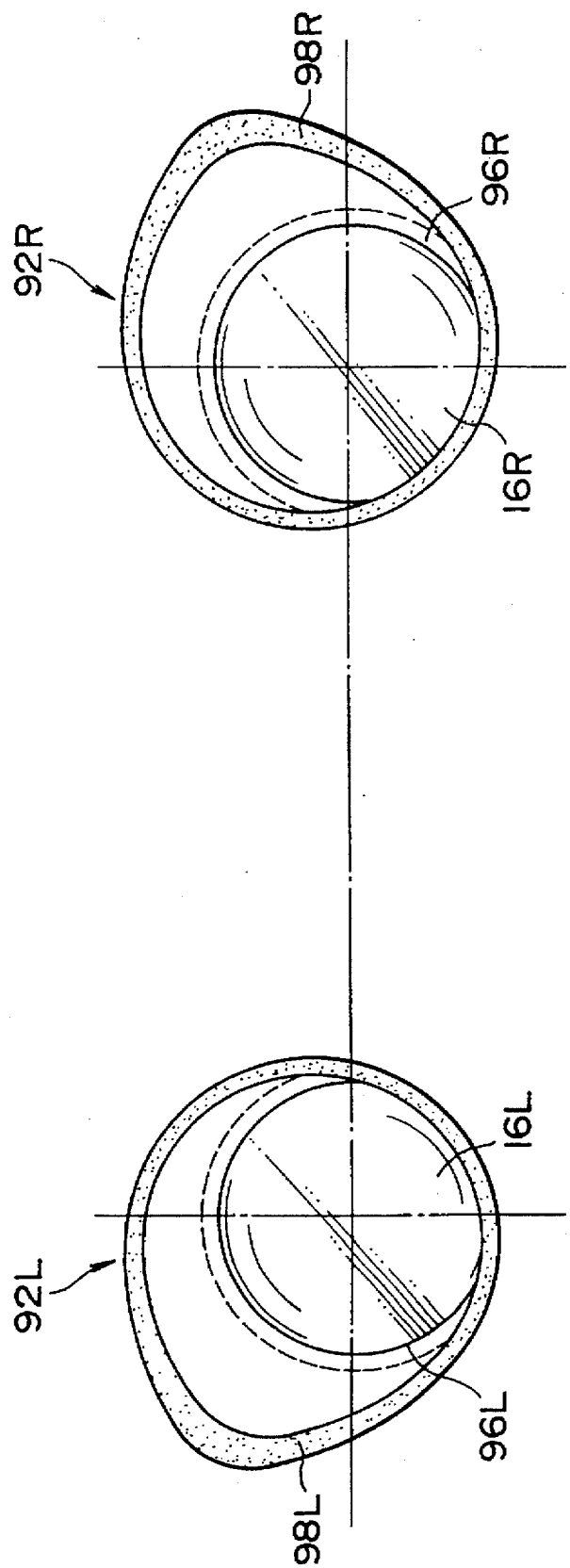
FIG. 14 show a schematic rear view of the embodiment of an eyepiece structure.

The eyecups 98L and 98R are shown in a rear view in FIG. 14. The shape shown in FIG. 14 of the eyecups 98L and 98R ensures proper shielding of peripheral light for users with or without spectacles. As described, the eyecups 98L and 98R or eyecup barrels 96L and 96R may not be rotated, so the position of the eyecups as shown in FIG. 14 is always maintained.

The eyecup mechanism 92L, 92R as described is able to be used with spectacles or without, and offers a robust construction, resistant to harsh environments. Furthermore, the eyecup mechanism 92L as described is conveniently changeable between modes, and uses few and simple parts.

The present disclosure relates to subject matter contained in Japanese Patent Application No. HEI 06-014035, and Japanese Utility Model Application No. HEI 06-000455, and HEI 06-000456, all filed on Jan. 12, 1994, which are expressly incorporated herein by reference in their entireties.

What is claimed is:

1. A binocular, comprising:
   a central body, having an interior cavity sealed to prevent the intrusion of water;
   first and second lens barrels provided to said central body, having first and second focusing lens frames provided therein, said first and second lens barrels each having an optical axis, and each of said first and second focusing lens frames being movable in a direction of a respective optical axis;
   a body recess provided in said central body adjacent said interior cavity and separated from said interior cavity by a partition wall;
   a rotatable focusing member provided in said body recess, and accessible to a user;
   a shaft hole formed through said partition wall joining said central cavity and said body recess;
   an adjusting shaft, penetrating said partition wall to said interior cavity through said shaft hole, and having an axis parallel to said optical axes, said adjusting shaft being driven in an axial direction by said focusing member and axially driving said first and second focusing lens frames to focus said binocular; and
   a sealing member, surrounding said adjusting shaft between said partition wall and said adjusting shaft, and sealing said shaft hole to prevent the intrusion of water into said interior cavity while allowing said adjusting shaft to drive said lens frames.

2. The binocular according to claim 1,
   wherein said sealing member is a ring-shaped member having a circumferential groove formed in an outer circumference therein, said circumferential groove mating with said shaft hole formed in said partition wall.

3. The binocular according to claim 2,
   wherein said sealing member is formed from an elastomeric material, and an outer circumference of said adjusting shaft and an inner circumference of said hole formed in said partition wall are smoothly formed.

4. The binocular according to claim 1,
   wherein said focusing member comprises inner circumference threading, and
   wherein said inner circumference threading engages a ring piece having outer circumference threading, and
   wherein said ring piece engages said adjusting shaft, such that when said focusing member is rotated, said engaging inner circumference threading and outer circumference threading drive said ring piece axially, said ring piece thereby driving said adjusting shaft axially, and thereby driving said first and second focusing lens frames to focus said binocular.

5. The binocular according to claim 4,
   wherein said ring piece is provided with guide holes which engage guide members, said guide members being parallel with said adjusting shaft axis,
   and wherein said ring piece is restricted from rotation but allowed to move in a direction of said adjusting shaft axis by said engagement of said guide members and said guide holes.

6. The binocular according to claim 1,
   wherein said adjusting shaft is rotatably supported, and
   wherein said adjusting shaft is threaded at a distal end proximate to said first and second focusing lens frames, and
   wherein said threaded end of said adjusting shaft is associated with said first lens frame, such that when said adjusting shaft is rotated, said first lens frame is moved, relative to said second lens frame, in the direction of said optical axis of said first lens frame.

7. The binocular according to claim 6, further comprising:
   a seal cover integral with said body and having a cover recess formed therein adjacent said body recess;
   a diopter correction knob, provided in said cover recess, and accessible to a user;
   a seal cover bore provided in said seal cover between said body recess and said cover recess; and
   a diopter adjusting shaft, passing through said seal cover bore from said cover recess into said body recess, said diopter adjusting shaft engaging said seal cover to be rotatable but not axially movable and engaging said adjusting shaft such that said adjusting shaft is rotatively drivable by said diopter adjusting shaft but axially movable relative to said diopter adjusting shaft, said diopter adjusting shaft engaged with said diopter correction knob and rotatable by rotation of said diopter correction knob.

8. The binocular according to claim 7,
   wherein said diopter adjusting shaft is provided with guide members on an exterior surface, and
   wherein said diopter adjusting knob is provided with axial guide grooves on an interior surface, engaging said guide members, such that said diopter adjusting knob is axially movable relative to said diopter adjusting shaft but able to rotatively drive said diopter adjusting shaft, and
   wherein said diopter adjusting knob is retractable into said second recess.

9. The binocular according to claim 8,
   wherein spring-loaded retraction means is provided between said diopter adjusting knob and said diopter adjusting shaft, said retraction means holding said diopter adjusting knob in a retracted position within said cover recess when said diopter adjusting knob is pushed from an extended position protruding from said cover recess, toward said body and subsequently released, and said retraction means extending said diopter adjustment knob from said retracted position to said extended position when said diopter adjusting knob is again pressed towards said body and subsequently released.

10. A binocular comprising:
    a central body, having an interior cavity sealed to prevent the intrusion of water;
    first and second lens barrels provided to said central body, having first and second focusing lens frames provided therein, said first and second lens barrels each having an optical axis; and each of said focusing lens frames being movable in a direction of a respective optical axis;
    a body recess provided in said body adjacent said interior cavity and separated from said interior cavity by a partition wall;

a seal cover integral with said central body, provided adjacent said body recess and having a cover recess formed therein;

a rotatable focusing member provided in said body recess, and accessible to a user;

a diopter correction knob, provided in said cover recess, and accessible to a user;

a shaft hole formed in said partition wall between said interior cavity and said body recess;

a seal cover bore provided in said seal cover between said body recess and said seal cover recess;

a first adjusting shaft, penetrating said partition wall into said interior cavity through said shaft hole and having an axis parallel to said optical axes, said first adjusting shaft being axially drivable by said focusing member to axially drive said first and second focusing lens frames to focus said binocular, and said first adjusting shaft being rotatably supported;

a second adjusting shaft, passing through said seal cover bore from said cover recess into said body recess, engaging said partition wall to be rotatable but not axially movable, and engaging said first adjusting shaft such that said first adjusting shaft is rotatively drivable by said second adjusting shaft but axially movable relative to said second adjusting shaft, said second adjusting shaft engaged with said diopter correction knob and rotatable by rotation of said diopter correction knob; and a sealing member, provided between said partition wall and said first adjusting shaft, and sealing said shaft hole to prevent the intrusion of water while allowing said adjusting shaft to drive said first and second focusing lens frames.

11. The binocular according to claim 10, wherein said first adjusting shaft is threaded at a distal end proximate to said first and second focusing lens frames, and wherein said threaded end of said first adjusting shaft is associated with said first lens frame, such that when said first adjusting shaft is rotatively driven by said second adjusting shaft, said first lens frame is moved, relative to said second lens frame, in the direction of said optical axis of said first lens frame.

12. The binocular according to claim 10, wherein said focusing member comprises inner circumference threads, and wherein said inner circumference threads engage a ring piece having outer circumference threads, and wherein said ring piece engages said first adjusting shaft, such that when said focusing member is rotated, said engaging inner circumference threads and outer circumference threads driving said ring piece axially, said ring piece driving said first adjusting shaft axially, and thereby driving said first and second focusing lens frames to focus said binocular.

13. The binocular according to claim 12, wherein said ring piece is provided with guide holes which engage guide members, said guide members being parallel with said adjusting shaft axis, and wherein said ring piece is restricted from rotation but allowed to move in a direction of said first adjusting shaft axis by said engagement of said guide members and said guide holes.

14. The binocular according to claim 10, wherein said second adjusting shaft is provided with guide members on an exterior surface, and wherein said diopter correction knob is provided with axial guide grooves on an interior surface, engaging said guide members, such that said diopter correction knob is axially movable relative to said second adjusting shaft but able to rotatively drive said second adjusting shaft, and wherein said diopter correction knob is retractable into said cover recess.

15. The binocular according to claim 14, wherein spring-loaded retraction means is provided between said diopter correction knob and said second adjusting shaft, said retraction means holding said diopter correction knob in a retracted position within said second recess when said diopter correction knob is pushed, from an extended position protruding from said cover recess, towards said body and subsequently released, and said retraction means extending said diopter correction knob from said retracted position to said extended position when said diopter correction knob is again pressed towards said body and subsequently released.

16. The binocular according to claim 10, wherein said sealing member is a ring-shaped member having a circumferential groove formed in an outer circumference therein, said circumferential groove mating with said shaft hole formed in said partition wall.

17. The binocular according to claim 16, wherein said sealing member is formed from an elastomer material, and an outer circumference of said first adjusting shaft and an inner circumference of said shaft hole formed in said partition wall are smoothly formed.

18. A waterproof binocular comprising:

a first optical portion moved by a first mechanism, and a second optical portion moved by a second mechanism;

a watertight cavity having a shaft hole formed in a wall of said watertight cavity;

a first shaft, penetrating said wall via said shaft hole into said watertight cavity, said first shaft supported to be both axially movable and rotatable;

a second shaft, said second shaft rotatively driving said first shaft, and said second shaft supported to be rotatable but not movable in an axial direction of said second shaft;

a first control member, provided to said first shaft, for moving said first shaft axially;

a second control member, provided to said second shaft, for rotating said second shaft and thereby said first shaft, a sealing member, provided between said first shaft and said wall, for sealing said shaft hole to prevent the intrusion of water, said sealing member allowing the rotational and axial movement of said first shaft, wherein said first shaft controls said first mechanism in said watertight portion of said binocular when axially moved, and said first shaft controls said second mechanism in said watertight portion of said binocular when rotatively moved.

19. A binocular, comprising:

a central body, having an interior cavity sealed to prevent the intrusion of water;

first and second lens barrels provided to said central body, having first and second focusing lens frames provided therein, said first and second lens barrels each having an optical axis, and each of said first and second focusing lens frames being movable in a direction of a respective optical axis;

a body recess provided in said central body adjacent said interior cavity and separated from said interior cavity by a partition wall;

a rotatable focusing member provided in said body recess, and accessible to a user;

a shaft hole formed through said partition wall joining said central cavity and said body recess;

an adjusting shaft, penetrating said partition wall to said interior cavity through said shaft hole, and having an axis parallel to said optical axes, said adjusting shaft being supported to be both rotatable and axially movable; and a sealing member sealing said shaft hole between said adjusting shaft and said partition wall to prevent the intrusion of water into said interior cavity while allowing said adjusting shaft to be moved both axially and rotatably within said sealing member.

20. A binocular, comprising:

a central body, having an interior cavity sealed to prevent the intrusion of water;

first and second lens barrels provided to said central body, having first and second focusing lens frames provided therein, said first and second lens barrels each having an optical axis, and each of said first and second focusing lens frames being movable in a direction of a respective optical axis;

a body recess provided in said central body adjacent said interior cavity and separated from said interior cavity by a partition wall;

a rotatable focusing member provided in said body recess, and accessible to a user;

a shaft hole formed through said partition wall joining said central cavity and said body recess;

an adjusting shaft having an axis parallel to said optical axes, said adjusting shaft comprising a smooth shaft section and a driven shaft section separated from said smooth shaft section, said smooth shaft section penetrating said partition wall to said interior cavity through said shaft hole, and said driven shaft section engaging said focusing member outside said interior cavity and outside said shaft hole; and a sealing member sealing said shaft hole between said smooth shaft section and said partition wall to prevent the intrusion of water into said interior cavity while allowing said adjusting shaft to be moved both axially and rotatably within said sealing member.

21. The binocular according to claim 20, wherein said driven shaft section comprises a threaded ring piece axially driven by rotation of said focusing member, for converting rotation of said focusing member into axially linear movement of said first lens frame and said second lens frame.

22. The binocular according to claim 21, where said driven shaft section further comprises a rotatably drivable section rotatively driven via a diopter adjusting assembly.

23. A binocular, comprising:

a body having an interior cavity, said interior cavity having a wall with a shaft hole therethrough;

first and second lens barrels associated with said body having optical axes, and having first and second focusing lens frames provided therein;

a shaft supported to be axially movable and rotatable, and extending through said wall from said interior cavity to an exterior of said body, said shaft being a smooth circumferential surface wherein said shaft extends through said shaft hole, first threads outside said interior cavity for moving said first focusing lens frame and said second focusing lens frame together in the direction of said optical axes when said first threads are axially driven, and second threads inside said interior cavity for moving said first focusing lens frame with respect to said second focusing lens frame in the direction of said optical axes when said second threads are rotated;

a rotatable focusing member outside said body for axially driving said first threads;

a rotatable diopter adjusting member outside said central body for rotating said second threads; and a sealing member positioned between said smooth surface and said wall for sealing said shaft hole.

24. The binocular according to claim 23, wherein said sealing member prevents the intrusion of water into said interior cavity while allowing said adjusting shaft to be moved both axially and rotatably within said sealing member.

* * * * *